US011283290B2

(12) United States Patent
Richmond et al.

(10) Patent No.: US 11,283,290 B2
(45) Date of Patent: Mar. 22, 2022

(54) APPARATUS, SYSTEMS, AND METHODS FOR PROVIDING A RAPID THRESHOLD AMOUNT OF POWER TO A CUSTOMER LOAD DURING TRANSFER BETWEEN A PRIMARY POWER SUPPLY AND A SECONDARY POWER SUPPLY

(71) Applicant: E2COMPLY LLC, Bonita Springs, FL (US)

(72) Inventors: James Richmond, Estero, FL (US); Scott Gall, Bonita Springs, FL (US); Timothy Richmond, Estero, FL (US)

( * ) Notice: Subject to any disclaimer, the term of this patent is extended or adjusted under 35 U.S.C. 154(b) by 0 days.

(21) Appl. No.: 17/362,766

(22) Filed: Jun. 29, 2021

(65) Prior Publication Data

US 2021/0408823 A1    Dec. 30, 2021

Related U.S. Application Data

(60) Provisional application No. 63/060,740, filed on Aug. 4, 2020, provisional application No. 63/045,535, filed on Jun. 29, 2020.

(51) Int. Cl.
*H02J 9/08* (2006.01)
*H02J 9/06* (2006.01)
(Continued)

(52) U.S. Cl.
CPC ............ *H02J 9/062* (2013.01); *H02J 3/0012* (2020.01); *H02J 3/466* (2020.01); *H02J 9/08* (2013.01);
(Continued)

(58) Field of Classification Search
CPC .... H02J 9/08; H02J 9/062; H02J 3/466; H02J 3/0012; H02J 2300/24; H02J 2300/10
See application file for complete search history.

(56) References Cited

U.S. PATENT DOCUMENTS 9,711,967 B1 * 7/2017 Czarnecki ............... H02J 9/062
2008/0088183 A1 * 4/2008 Eckroad ................. H02J 3/1842
307/66

(Continued)

FOREIGN PATENT DOCUMENTS

WO    WO-2019039114 A1 * 2/2019 ............... H02J 7/00

*Primary Examiner* — Harry R Behm
(74) *Attorney, Agent, or Firm* — Derek Fahey, Esq.; The Plus IP Firm

(57) ABSTRACT

A system for providing a rapid threshold amount of power to a customer load during transfer between a primary power supply and a secondary power supply is disclosed. The system is electrically connected between a customer metering system and the customer load. The system includes a secondary power supply not in electrical connectivity with the primary power supply. The secondary power supply includes a secondary power supply source for generating electrical power, a switching module, and an energy storage system in electrical communication with the secondary power supply source and the switching module. The energy storage system includes a high discharge battery and is configured to rapidly discharge power to the customer load when the switching module switches between the primary power supply and the secondary power supply. The switching module includes at least one set of contacts in communication with at least one inverter of the secondary power supply.

19 Claims, 10 Drawing Sheets

(51) Int. Cl.
*H02J 3/46* (2006.01)
*H02J 3/00* (2006.01)

(52) U.S. Cl.
CPC ....... *H02J 2203/10* (2020.01); *H02J 2300/10* (2020.01); *H02J 2300/24* (2020.01)

(56) References Cited

U.S. PATENT DOCUMENTS

| | | | |
|---|---|---|---|
| 2015/0168975 A1* | 6/2015 | Loucks | H02J 9/061 700/296 |
| 2015/0255999 A1* | 9/2015 | Kim | H02J 7/0042 320/134 |
| 2016/0054771 A1* | 2/2016 | Fallon | G06F 1/26 713/300 |

* cited by examiner

APPARATUS, SYSTEMS, AND METHODS FOR PROVIDING A RAPID THRESHOLD AMOUNT OF POWER TO A CUSTOMER LOAD DURING TRANSFER BETWEEN A PRIMARY POWER SUPPLY AND A SECONDARY POWER SUPPLY

CROSS-REFERENCE TO RELATED APPLICATIONS

This application claims the benefit of the filing dates of U.S. Provisional Application Ser. No. 63/045,535 titled "Apparatus, Systems, and Methods for Providing a Rapid Threshold Amount of Power to Large Loads During Transfer Between Power Supplies" having a filing date of Jun. 29, 2020, and U.S. Provisional Application Ser. No. 63/060,740 titled "Apparatus, Systems, and Methods for Providing a Rapid Threshold Amount of Power to Large Loads During Transfer Between Power Supplies" having a filing date of Aug. 4, 2020 and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the delivery of energy to consumers, and more particularly to systems and methods for providing a rapid threshold amount of power to customer loads during transfer between a primary power supply and a secondary power supply.

BACKGROUND

Microgrids are islands formed at a facility or in an electrical distribution system configured to facilitate penetration of distributed resources and associated loads, and also improve the security of power supplies. Generally, microgrids and its integration into electrical systems seek to promote sustainability and reliability while supporting an interconnected configuration. In addition, these microgrid systems include inverters used for converting direct current to alternating current to utilize renewable energy. However, a common issue associated with these systems is that the microgrids are neither modular nor scalable. For example, installation of energy storage inverters requires a significant amount of time and labor, and even after installation, it is often likely that the given configuration prevents simple reinstallation into an alternative system. Additionally, current energy storage systems associated with microgrids lack the ability to support power mechanisms configured to function at high performance and high discharge rates.

Moreover, when systems inevitably fall victim to stress caused by voltage, frequency fluctuations, and faults; there is a significant stall during the switch from depending on the main utility grid to the standalone function of the applicable microgrid. This stall is based on a decision from a controller associated with the system and can be crucial for configurations that support high energy consuming devices that are time-sensitive, such as large industrial refrigerators/freezers, depending on the length and power requirements. The high energy consuming devices may include loads that are critical components of infrastructure.

Furthermore, across the country and throughout the world, individuals in mission critical needs and facilities such as hospitals, nursing homes, long term care facilities, data centers, and government operations are dependent on power for their well-being and performance. It is imperative that these mission critical centers have continuous access to power and electricity without suffering from downtime cause by power outages. For example, hospitals provide medical treatment to patients using acute medical care that relies on electricity. This care is power dependent for the patient's survival and any shortage of power may cause life threatening complications. The mission critical centers rely on power for many operations including lighting, security systems, fire alarm and egress systems, environmental control, electronic records, data servers, and other electricity dependent operations. With the rapid development of technology, mission critical facilities are becoming increasingly reliant on the use of electricity; thus stable, reliable, stand by power sources are in greater demand.

Currently, issues related to standby power for mission critical facilities, such as generators, includes design issues, capacity issues, and maintenance and supply issues. Much of the present technology faces design issues including system components located in positions vulnerable to environmental hazards, the systems and exhaust stacks not properly secured, and failed systems between switching from the electrical grid to backup power and vice versa. Any transitional lag between utility power and generator power may disrupt mission critical operations and cause technology to reboot, turn off, reprogram, and other technical difficulties. Present technology cannot provide the adequate failsafe backup power required by these mission critical facilities. On average, the transitional lag between switching power can take a few seconds and if the systems fail then power may not be restored to the mission critical facilities for up to a few hours. The current technology also has capacity issues when supplying these facilities with backup power. Often the generators are limited in the maximum load they can carry and output to devices causing mission critical facilities to ration power from the backup generators to top priority operations. For example, in most hospitals, if there is a power outage, then the backup power source cannot produce a load to power the hospitals air conditioning. Lack of air conditioning can be profoundly serious for some patients that need regulated body temperatures during recovery which can lead to bacteria growth and subsequent infections. Many of these mission critical facilities are vulnerable to the current issues presented by existing technology.

Therefore, there exists a need for improvements over the prior art and more particularly for a more efficient way to not only install microgrids and essential components, such as energy storage systems, in a modular and scalable fashion, but also implement microgrid components that support high performance, high discharge, and energy storage functionality.

SUMMARY

This Summary is provided to introduce a selection of disclosed concepts in a simplified form that are further described below in the Detailed Description, including the drawings provided. This Summary is not intended to identify key features or essential features of the claimed subject matter. Nor is this Summary intended to be used to limit the claimed subject matter's scope.

In one embodiment, a system for providing a rapid threshold amount of power to a customer load during transfer between a primary power supply and a secondary power supply, wherein the secondary power supply is not in electrical connectivity with the primary power supply, wherein the system is electrically connected between a customer metering system and the customer load is disclosed. The system includes a secondary power supply source of the secondary power supply for generating electrical power and an energy storage system of the secondary power supply in electrical communication with the secondary power supply source. The energy storage system includes a high discharge battery, wherein the high discharge battery is at least 2C, and the energy storage system is configured to rapidly discharge power to the customer load. The system further includes a switching module in electrical communication with the energy storage system. The switching module includes at least one set of contacts in communication with at least one inverter of the secondary power supply where the switching module is configured for switching between the primary power supply and the secondary power supply.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims. The foregoing and other features and advantages of the present invention will be apparent from the following more particular description of the preferred embodiments of the invention, as illustrated in the accompanying drawings.

BRIEF DESCRIPTION OF THE DRAWINGS

The accompanying drawings, which are incorporated in and constitute part of this specification, illustrate embodiments of the invention and together with the description, explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
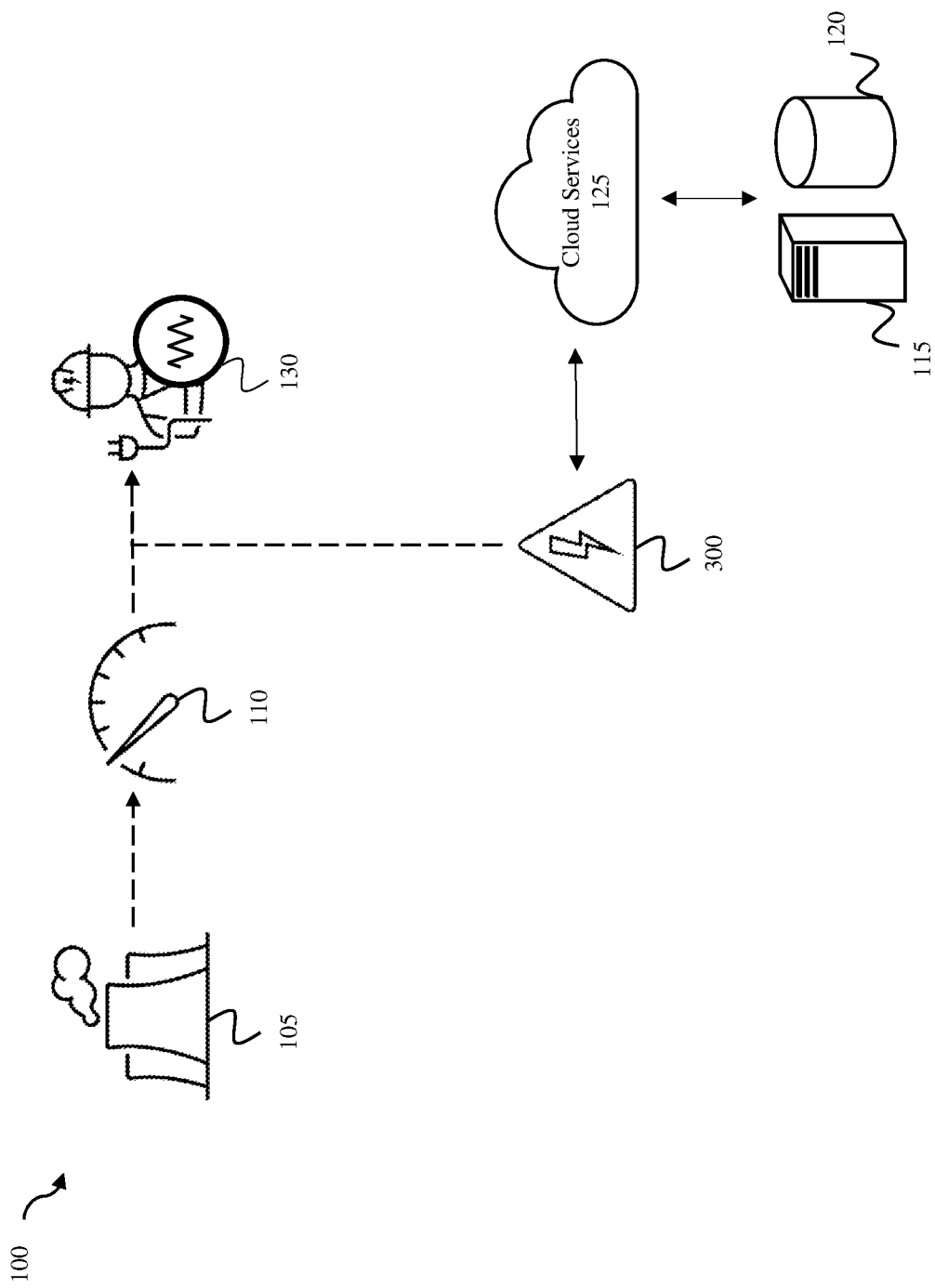
FIG. 1 illustrates a diagram of an operating environment that supports a system for providing a rapid threshold amount of power to customer loads during transfer between a primary power supply and a secondary power supply, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a rapid threshold amount of power to a customer load during transfer between a primary power supply and a secondary power supply. The system improves upon the prior art by having a secondary power supply source and an energy storage system. Specifically, the energy storage system is in electrical communication with the secondary power supply source. The system improves upon the prior art because the energy storage system comprises a high discharge battery and is configured to rapidly discharge power to the customer load. The switching module includes at least one set of contacts in communication with at least one inverter of the energy storage system. The switching module improves upon the prior art by switching to the energy storage system where the system maintains hot voltage lines in communication with the customer load such that the system provides a rapid threshold amount of power to a customer load during transfer between a primary power supply and a secondary power supply.

Referring now to FIG. 1, a diagram of an operating environment 100 that supports a system for providing a rapid threshold amount of power to customer loads during transfer between a primary power supply and a secondary power supply is shown, according to an example embodiment. The operating environment 100 that supports the system 300 includes a primary power supply 105 connected to a meter 110, the system 300 connected to a customer load 130, and the system 300 in communication with cloud services 125 where the cloud services may include communication with at least one server 115 and at least one database 120. In one embodiment, the customer load is at least 500 kilowatts. It is understood that cloud services may include a communications network. Communications network may include one or more packet switched networks, such as the Internet, or any local area networks, wide area networks, enterprise private networks, cellular networks, phone networks, mobile communications networks, or any combination of the above.

The server 115 may include a software engine that delivers applications, data, program code and other information to networked devices. The software engine of server may perform other processes such as transferring multimedia data in a stream of packets that are interpreted and rendered by a software application as the packets arrive. FIG. 1 further shows that server 115 includes a database or repository 120, which may be a relational database comprising a Structured Query Language (SQL) database stored in a SQL server or a database that adheres to the NoSQL paradigm. It is understood that other components of the system may also include databases.

The primary power supply generally includes electrical utility power from a power plant deriving its energy from a variety of sources including, but not limited to, nuclear energy, coal, natural gas, fossil fuel, solar, and wind energy. Transformers, sub stations, power generation plants, utility transmission systems, feeder systems and other utility power supply components may also be included in the primary power supply or primary power supply grid. The primary power supply 105 is usually maintained and operated from by local and national regulatory authorities. The primary power source is connected to the meter 110 which is configured to measure the amount of electricity distributed to the customer. There are two connection points on the meter, including the connection to the primary power supply and the connection that leads to distribution to the customer load 130. The meter is usually owned by the utility company operating the primary power source, and it is also responsible for installing, maintaining, and reading the meter. Thus, any connections on the primary power supply side of the meter by anyone other than the utility company is considered tampering. Therefore, the system 300 is connected on the customer side of the meter. The meter used herein may include a metering system. The meter is a device or system that measures the amount of electric energy consumed by a residence, a business, or an electrically powered device. Large commercial and industrial premises may use electronic meters which record power usage in blocks of half an hour or less. These meters may be confirmed to measure one, two or three phase power. The meters may include digital meters and metering systems, smart meters and metering systems, electronic meters and metering systems, electro mechanical meters and metering systems, accumulation meters and metering systems, interval meters and metering systems, industrial flow measurement meters, metered rooms, and vault meter systems. However, it is understood that other types of metered systems may be used and are within the spirit and scope of the present invention.

On the customer side of the meter, the system 300 is connected to the customer load 130. The customer load 130 is generally a residential home, industrial building, or commercial building, each including electronic and appliances that require electrical power to operate. The system is in further communication with cloud services 125 which may include communication to a network. In one embodiment, system 300 may include a network and at least one processer in communication with cloud services 125. The cloud services may include different types of cloud computing systems. The cloud services may include at least one server 115, databases 120, remote processors, computing power, on-demand accessibility functions, and user interfaces without the direct active management by a user. In one embodiment, a network may include both the software and the hardware composing the system. The hardware may include computer electronic devices such as cables, switches, access points, modems, and routers, while the software may include operating systems, applications, firewalls, and the like. The components of system 300 are communicatively interacting with the cloud services 125 and the network.

Figure 2:
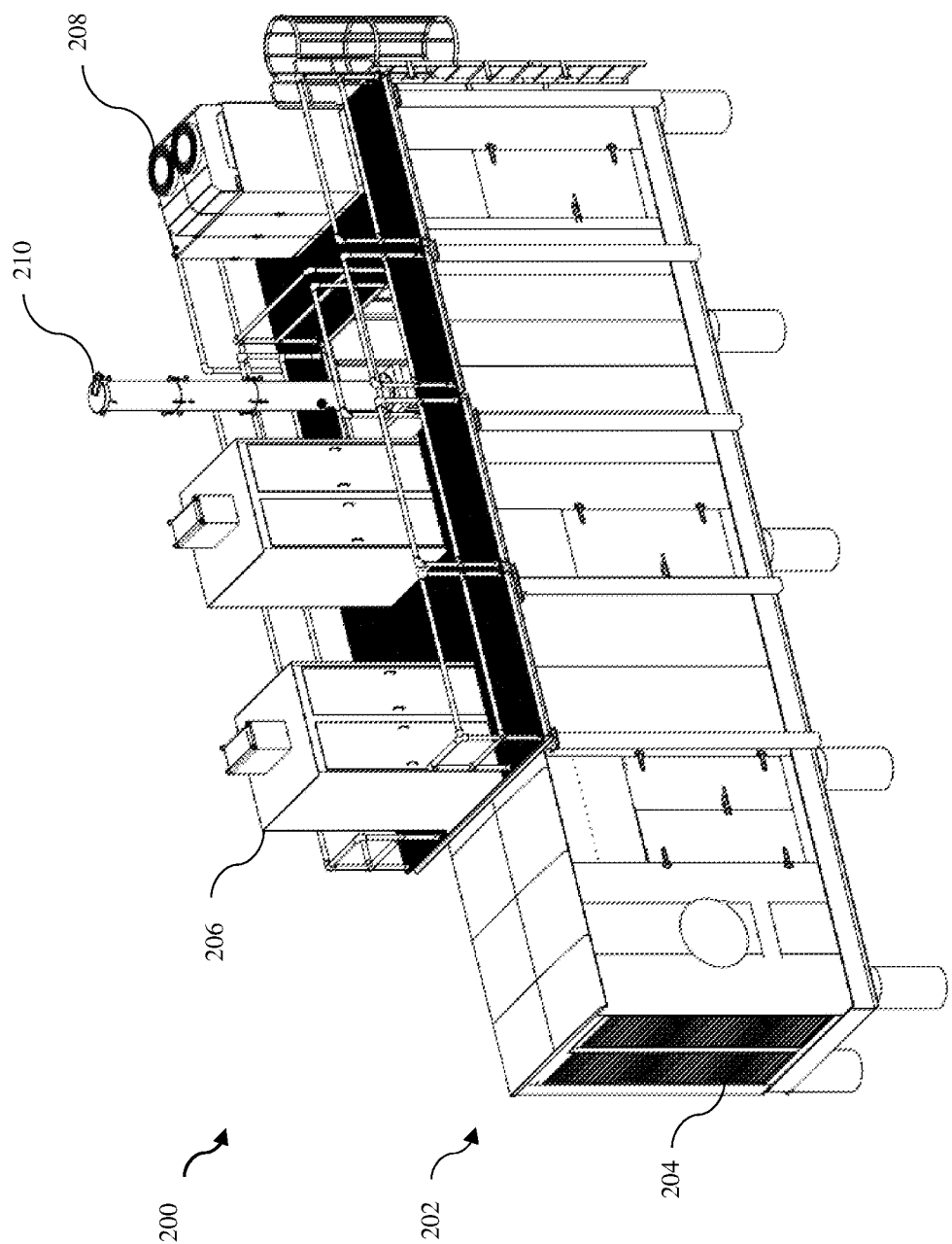
FIG. 2 illustrates an example enclosure for the system, according to an example embodiment.

Referring to FIG. 2, an illustration of an enclosure 200 for the system is shown, according to an example embodiment. The enclosure houses the system which includes the secondary power supply 202 and the switching module. The secondary power supply 202 includes the secondary power supply source 204, which may be a generator set, for example. In one embodiment, the system includes at least one secondary power supply source. The dimensions and component configuration of the enclosure may depend on the size of the secondary power supply source such that, in one embodiment, at least one secondary power supply source having outputs at least 500 kilowatts and may include modular generators at least 500 kW or greater than 500 kW. In another embodiments, there may be at least one secondary power supply source where the secondary power supply source includes at least one of a natural gas fuel powered generator, a gasoline fuel powered generator, a propane fuel powered generator, a diesel fuel powered generator, a solar fuel powered generator, and a second primary power source. Other embodiments having a plurality of secondary power supply sources may be included and is within the spirt and scope of this disclosure. In one embodiment the secondary power supply source may include a natural gas generator set where the natural gas generator set is at least one of a 650 kWe, 1000 kWe, and 1400 kWe generator set. The secondary power supply source can generate an output of 480/600 VAC. In one embodiment, the secondary power supply may include a brushless exciter with optional permanent magnet generator where the power supply voltage is generated by a permanent magnet generator mounted within the secondary power supply. The permanent magnet generator delivers constant voltage to the AVR of the secondary power supply source where the voltage is independent of the main alternator winding of the secondary power supply source generating a voltage reference shunted on alternator output terminals. The AVR then delivers a excitation current suitable for the load of the system. Therefore, the system, having the permanent magnet generator, has a high overload capacity.

The secondary power supply source is configured to supply enough power to support the customer loads. The enclosure is configured to provide a modular and interchangeable means for providing rapid amounts of power. The enclosure may include a battery cabinet 206 configured to house a high discharge battery. The high discharge battery may be at least 2C battery. In more preferable embodiments, the high discharge battery may be at least a 4C battery. The enclosure also houses at least one inverter 208 of the energy storage system. The battery cabinet may contain at least one high discharge battery such that the system may include a plurality of high discharge batteries. Additionally, a modular exhaust system 210 may be used and included on the enclosure.

The modular design of the enclosure includes the components of the system which are preassembled to reduce construction and installation times in the field. Particularly, in mission critical facilities and emergency situations, the system is designed to be installed and removed or broken down quickly to be moved to another site as needed.

Figure 3A:
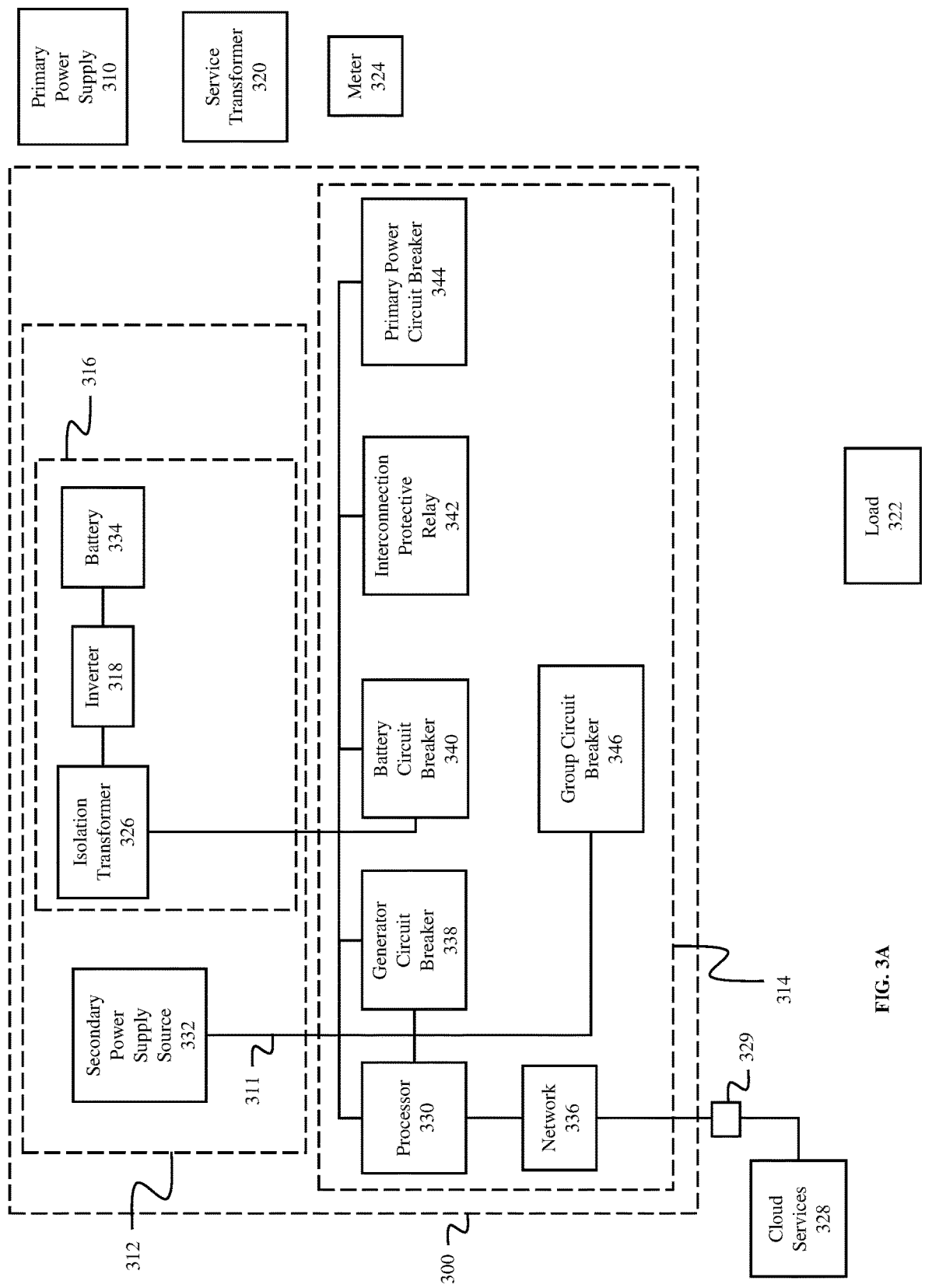
FIG. 3A is a block diagram illustrating the communication network of the main components of the system for providing a rapid threshold amount of power to a customer load during transfer between a primary power supply and a secondary power supply, according to an example embodiment.
Figure 3B:
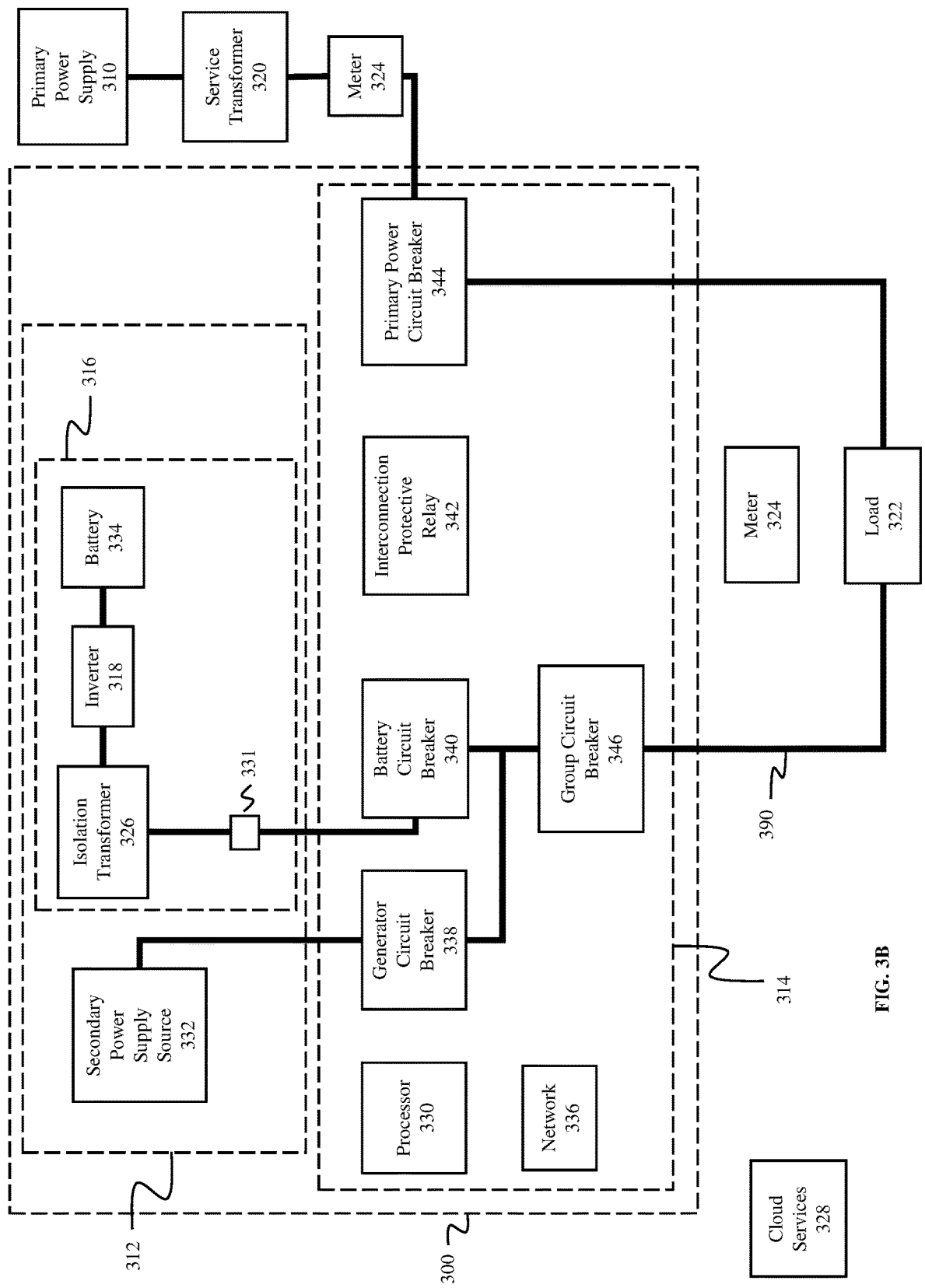
FIG. 3B is a block diagram illustrating power transmission of the main components of the system for providing a rapid threshold amount of power to a customer load during transfer between a primary power supply and a secondary power supply illustrating, according to an example embodiment.
Figure 3C:
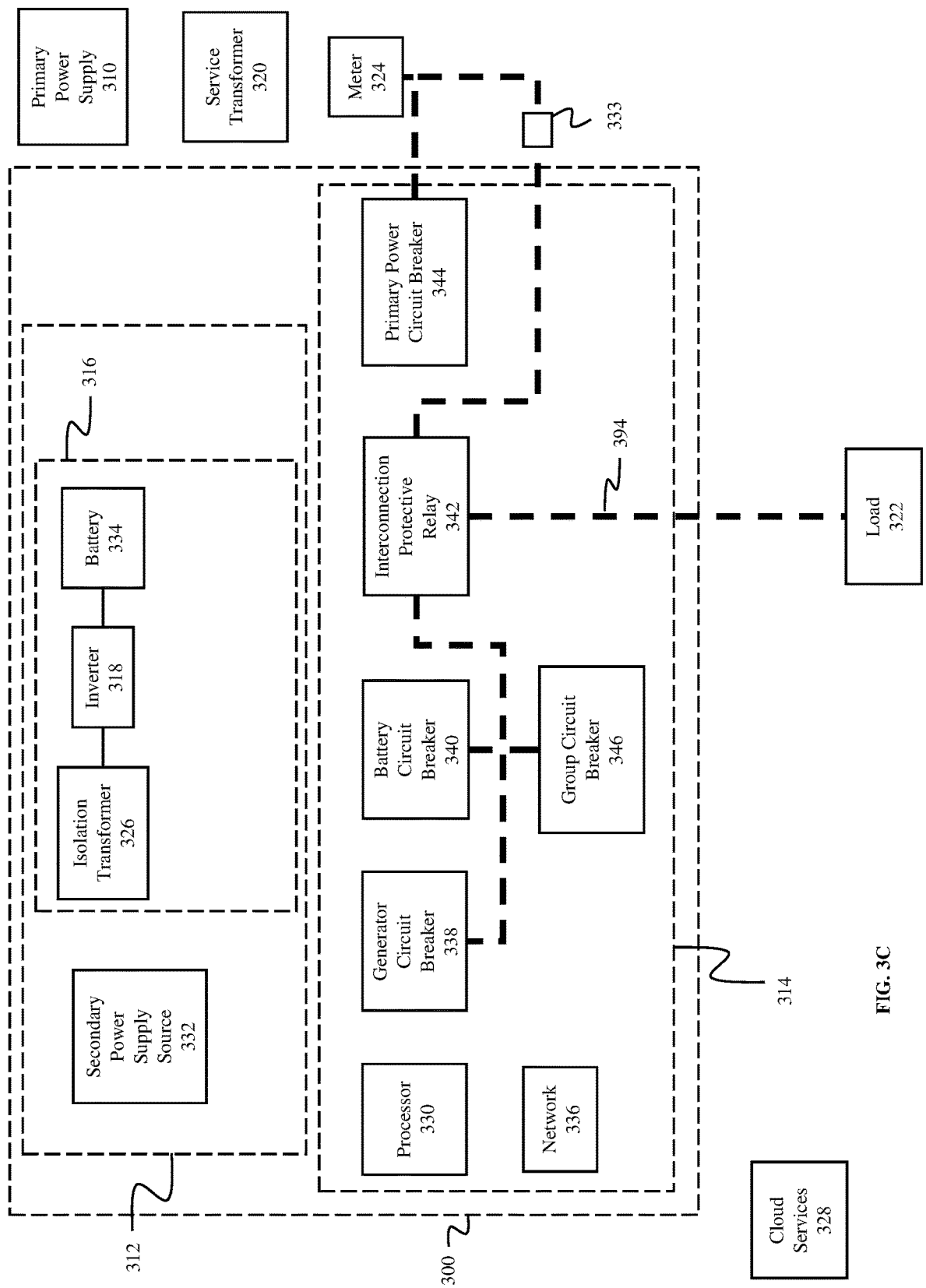
FIG. 3C is a block diagram illustrating the metering system of components of the system for providing a rapid threshold amount of power to a customer load during transfer between a primary power supply and a secondary power, according to an example embodiment.
Figure 3D:
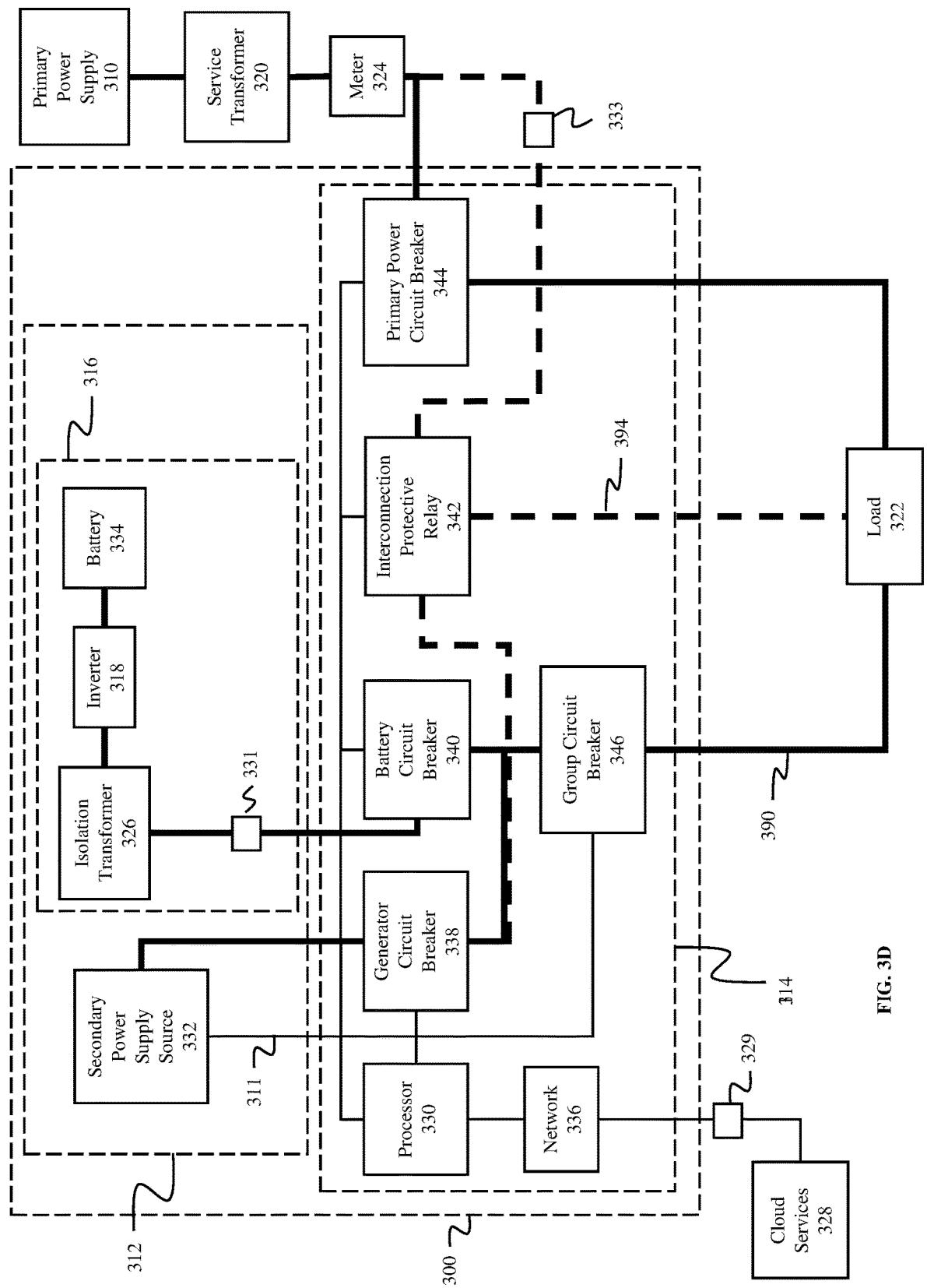
FIG. 3D is a block diagram of illustrating the communication, power, and metering of the system for providing a rapid threshold amount of power to a customer load during transfer between a primary power supply and a secondary power supply illustrating the metering of components on the customer side of the meter, according to an example embodiment.

Referring now to FIGS. 3A-3D, a block diagram illustrating main components of the system 300 for providing a rapid threshold amount of power to a customer load during transfer between a primary power supply and a secondary power supply is shown, according to an example embodiment. Specifically, FIG. 3A illustrates the communication network of the components of the system 300 that are in electrical communication with at least one processor, according to an example embodiment. FIG. 3B illustrates the power transmission between the components of the system that transmit power to the customer load, according to an example embodiment. FIG. 3C illustrates metering system of the components of the system, according to an example embodiment. FIG. 3D is an overlay of FIGS. 3A-3C illustrating the system 300.

System 300 is configured for providing a rapid threshold amount of power to a customer load 322 during transfer between a primary power supply 310 and a secondary power supply 312, where the secondary power supply is not in electrical connectivity with the primary power supply. The secondary power supply is configured for generating electrical power. The system is electrically connected between a customer metering system on the customer side of the meter 324 and the customer load. The system includes the secondary power supply 312 has a secondary power supply source 332 and an energy storage system 316. The system also includes a switching module 314. The primary power supply side of the meter 324 includes the meter 324, a service transformer 320, and the primary power supply 310.

In one embodiment, the switching module 314 may include a network 336, at least one processor 330, a generator circuit breaker 338, a battery circuit breaker 340, an interconnection protective relay 342, a primary power circuit breaker 344, and a group circuit breaker 146. The generator circuit breaker, the battery circuit breaker, the primary power circuit breaker, and the group circuit breaker may define automatic transfer switches of the switching module. The automatic transfer switch may include a 2000 A-6000 A switchgear up to 600 VAC. The automatic switch gear may include a 600 A-2500 A switchgear at 4160 VAC. Additionally, the automatic transfer switch may include up to 200 kAIC rated breakers and panel. The system includes circuit breakers including standard circuit breakers, ground fault circuit interrupter circuit breakers, arc fault circuit breakers, and other circuit breakers within the spirit and scope of the disclosure. The system also includes an interconnection protective relay configured to monitor the components of the system via the metering system of FIG. 3B. The interconnection protective relay detects power system problems and separates the local energy supply of the secondary power supply from the primary power supply. The interconnection protective relay may detect over/under-voltage, over/underfrequency, and rate of change of frequency of the system which may include the primary power supply parameters and the secondary power supply parameters and may send a corresponding signal, such as at least one first signal, the at least one processor for determining whether respective primary power supply thresholds and secondary power supply thresholds have been met.

In other embodiments, the switching module may include cloud services 128. The switching module is in communication with the secondary power supply 312 and the energy storage system 316 via the communication network 311 as indicated by the thin solid black line of FIG. 3A. The at least one processor 330 may include a microgrid controller and any device for the distribution of energy resources and loads in a predetermined electrical system to maintain frequency and voltage. In one embodiment, the switching module includes an automatic or automated transfer switch. The automatic transfer switch may include a 2000 A-6000 A switchgear up to 600 VAC. The automatic switch gear may include a 600 A-2500 A switchgear at 4160 VAC. Additionally, the automatic transfer switch may include up to 200 kAIC rated breakers and panel. In one embodiment, the switching module is configured within the enclosure such that the switching module can be accessed from the rear of the enclosure for maintenance.

The energy storage system includes a high discharge battery 334 where the high discharge battery is at least 2C meaning the high discharge battery is configured to discharge at least 2 amperes for up to thirty minutes. The energy storage system is configured to rapidly discharge power to the customer load. In other embodiments, the system may support a high discharge battery of greater than 2C, such as a 4C high discharge battery that is configured to discharge 4 amperes for fifteen minutes. The high discharge battery may include lithium-ion batteries including, lithium cobalt oxide-, lithium nickel manganese cobalt oxide, lithium nickel cobalt aluminum oxide, lithium titanate, and lithium iron phosphate-type batteries; lead acid and nickel cadmium batteries; and other batteries configured to rapidly discharge power to the customer load. In one embodiment, the energy storage system includes the high discharge battery 334, at least one inverter 318, and an isolation transformer 326. In another embodiment, the energy storage system may include all variations of chemical energy battery storage as well as other forms of mechanical energy storage such as pumped hydro, thermal energy storage, flywheel, etc. In one embodiment, the battery 334 may be a 1500 kWe/429 kWh Battery system at 3.5C discharge rate. In one embodiment, the high discharge battery may include a 100 Ah LiFEPO4, lithium iron phosphate, modules. The high discharge battery complies with UL 1973 standards such that the secondary power supply includes a fire suppression system.

In one embodiment, the at least one inverter may be a 1500 kWe at 600 VAC inverter. In another embodiment, the at least one inverter is a 1250 kW at 480 VAC. The at least one inverter includes AC breakers having shunt trips, DC disconnects, and DC input fuses. In another embodiment, the at least one inverter has a forced air-cooling system.

The energy storage system 316 is in electrical communication with the secondary power supply source 332. The switching module 314 is in electrical communication with the energy storage system where the switching module includes at least one set of contacts in communication with at least one inverter 318 of the energy storage system 316 (detailed in FIG. 4). The switching module is configured for switching between the primary power supply 310 and the secondary power supply 312.

In one embodiment, primary power supply 310 is at least one electric power grid and/or a collection of electric power grids configured to generate and distribute power across a plurality of customer loads. In one embodiment, primary power supply 310 is configured to utilize distributed resources, which may either be grid connected or independent of a grid. Examples of distributed resources include, but are not limited to, bio-massed generators, combustion turbines, thermal solar power and photovoltaic systems, fuel cells, wind turbines, microturbines, or any other applicable engines/generator sets and/or energy storage/control technologies.

The energy storage system 316 is energized and configured for allowing the system to fully recover the customer load 322 in less than 100 milliseconds when system 300 is switching from the primary power supply to the secondary power supply 312. In another embodiment, the energy storage system is configured for allowing the system to providing a rapid threshold amount of power, at least 500 kW in one embodiment, the customer load 322 in at most 4 milliseconds when the system 300 is switching from the primary power supply to the secondary power supply. Such an embodiment can be achieved with a secondary power supply of at least 500 kW and high discharge battery of at least 4C discharge rate. In another embodiment, the secondary power supply may include a 1500 kWe/429 kWh secondary power supply source and an energy storage system having a high discharge battery at a 3.5C discharge rate. However, other high discharge, high efficiency batteries may be used and are within the spirit and scope of the present disclosure.

In one embodiment, secondary power supply 312 may include a secondary power supply source 332 which may be an active distribution network, such as a microgrid or a collection of microgrids, configured to utilize a combination of distributed generation systems associated with primary power supply 310 and various types of loads at distribution voltage level. It is to be understood that secondary power supply 312 may also include micro sources which are renewable distributed energy resources integrated together for generating power at distribution voltage, various configurations of the integration and connectivity of primary power supply 310 and secondary power supply 312 are possible and within the spirit and scope of the claimed embodiments.

In certain embodiments, secondary power supply source 332 which may include any individual component or combination of a natural gas fuel powered generator, gasoline fuel powered generator, propane fuel powered generator, diesel fuel powered generator, solar fuel powered generator. If the secondary power supply source 332 is a generator set, for example, then the secondary power supply may be included in the enclosure (200 of FIG. 2). The secondary power supply may include modular components that may include at least a 500 kW generator or larger which may correspond to a high discharge battery of different discharge rates of at least 2C. For example, the generator may include a 1000 kW, a 1500 kW or a 2000 kW generator. However, other size generators may be included and are within the spirit and scope of the present invention.

In one embodiment, the energy storage system 316 is in electrical communication with secondary power supply source 332. The energy storage system 316 is configured to use at least one inverter 318 to deploy power as alternating current. In one embodiment, energy storage system 116 may include a 4C high discharge battery, where the high discharge battery satisfies at least one of NFPA 855 and UL 9540 standards. The NFPA 855 standards are the national fire protection association standard developed for the design, construction, installation, commissioning, operation, maintenance, and decommissioning of stationary energy storage systems including traditional battery systems such as those used by primary power supplies. The UL 9540 standards are energy storage system requirements defining installation codes containing size and separation requirements designed to prevent a fire originating in the energy storage system to propagate to adjacent energy storage systems. In one embodiment, the secondary power supply includes multiple energy storage systems where the system 300 satisfies UL 9540 standards to prevent the propagation of fire from a first energy storage system to a second energy storage system. To comply with NFPA 855 and UL 9540 standards, the system includes fire control, detection, and suppression systems.

In one embodiment, inverter 318 is a smart inverter configured to interact (either directly or via secondary power supply source 332) with at least one processor 330 enabling secondary power supply 312 to function as an internet of things (IOT)-based system configured to improve the efficiency of energy consumption associated with system 300 by allowing both primary power supply 310 and secondary power supply 312 to function as smart grids. In one embodiment, the at least one inverter is a bidirectional inverter operating at 50 and 60 Hz operation and is fully bidirectional. In one embodiment, the energy storage system 316 is a high discharge system configured to react based on data associated with customer load 322 or information received by the primary power supply or secondary power supply. In one embodiment, the at least one processor 330 may be a microgrid controller. In another embodiment, the at least one processor may include a processor configured for monitoring the communication within the system 300.

Energy storage system 316 in combination with at least one processor 330 is configured to generate one or more profiles for customer load 322 configured to be utilized by the at least one processor 330 to generate predictions in addition to adjust significant offsets between forecasts and actual demand associated with customer load 322. For example, the one or more load profiles may comprise data such as demand for a period of time (day, week, month, etc.), starting and stopping points associated with components of system 300, and other applicable energy metrics all of which are configured to be utilized by the at least one processor 330 to optimize functionality of system 300 and its components.

The at least one processor 330 may be included in the switching module 314 and may include any of the components of the switching module. In one embodiment, the components of system 300 are in electrical communication with the at least one processor 330 which is configured to predict, detect, and analyze functions and states of the components of system 300 in real-time via pluralities of data to interpret the health and states of system 300 and each of its components. For example, the at least one processor 330 may be a real-time monitoring module configured to interact with each of primary power supply 310, secondary power supply 312, and/or its applicable subcomponents to collect data such as frequency, voltage, current, power, state and any other applicable information associated with energy systems. In one embodiment, the real-time data acquired by the system is utilized by the at least one processor 330 to generate the one or more profiles of customer load 322. In one embodiment, at least one processor is configured to monitor a plurality of primary power parameters associated with customer load 322 derived from primary power supply 310 to detect if the plurality of utility supply parameters satisfies a plurality of utility power supply parameter thresholds. In one embodiment, the plurality of primary power supply parameters and the plurality of primary power supply parameter thresholds are established by at least one processor 330 based on the plurality of real-time monitoring module data collected by at least one processor indicating the health and/or status of system 300 and its components.

Similarly, in one embodiment, the at least one processor 330 is configured for determining if at least one primary power supply parameter fails to satisfy a respective primary power supply parameter threshold based on at least one first signal received from at least one first sensor 329 in electrical communication with the at least one processor and a remote processor communicatively coupled via a communications network with the at least one processor. The switching module is in communication with the cloud services (125 of FIG. 1) which may include the network 336 and the remote processor, such remote or other remote computing device configured to interact with the controls of the processor. In FIGS. 3A-3D, the switching module includes the network 336 and is communication with cloud services 328 where cloud services 328 may include servers, databases, and remote computing devices having remote processors. In other embodiments, the switching module includes the cloud services 328.

In certain embodiments system 300 may further comprises cloud services 328 configured to be communicatively coupled to a network 336. In one embodiment, Cloud services may include diverse types of cloud computing systems. The cloud services may include resources such as data storage such as servers and processors, computing power, on-demand accessibility functions, and user interfaces without the direct active management by a user. In one embodiment, a network may include both the software and the hardware composing the system. The hardware may include computer electronic devices such as cables, switches, access points, modems, and routers, while the software may include operating systems, applications, firewalls, and the like. Referring to FIG. 3A, the components are communicatively interacting via a communication network 311 as indicated by the thinner solid black lines or conductors throughout the embodiment connecting the elements. The communicative network structure between the elements is not limited to the disclosed embodiment and may include a plurality of communicative network structures.

Referring to FIG. 3A specifically, the communication network 311 as indicated by the thin solid black line of FIG. 3A. operate to communicate the at least one processor with the components of the switching module and the components of the secondary power supply. The at least one processor may determine to switch from the primary power supply to the secondary power supply or visa versa based on the plurality of real-time data collected from at least one sensor of the communication network 311. The communication network 311 may include wires, conductors, and a plurality of sensors, including the at least one first sensor, configured to communicate with the at least one processor. The at least one processor is also configured for switching from the primary power supply to the energy storage system after the at least one processor determines the at least one primary power supply parameter fails to satisfy the respective primary power supply parameter threshold by sending at least one second signal to the switching module.

Primary power supply parameters may include any such parameters as recorded by meter 324 including but not limited to electricity usage. Primary power supply parameters may also include the status of the voltage from the primary power supply, the current, the time of day, the price of electricity from the primary power supply, the energy demand, and other parameters within the spirit and scope of the disclosure. Each primary power supply parameter will have a respective primary power supply parameter threshold predetermined by the customer. In one embodiment, the customer can control the respective primary power supply parameter threshold using cloud services 328 and the remote processing device. For example, if the primary power supply parameter is voltage the respective primary power supply parameter threshold may include a minimum voltage, such as zero, where the system 300 will switch to the secondary power supply because no power is being output to the load via the primary power supply and the primary power supply parameter fails to satisfy the respective primary power supply threshold. Additionally, if the primary power supply parameter is cost of electricity supplied by the primary power supply, then the respective primary power supply parameter threshold may include a maximum price per kilowatt where the system switches to the secondary power supply when the maximum price threshold is reached. The cloud services, including the servers, databases, and remote processors, may supply the at least one processor 330 with real time data to analyze and determine that the primary power supply parameter fails to satisfy the respective primary power supply threshold.

In one embodiment, switching module 314 is a plurality of automated transfer switches communicatively coupled to the at least one processor 330 configured to transfer power to and from primary power supply 310 and/or secondary power supply 312, depending on the configuration and status of system 300. For example, at least one processor 330 is configured to instruct switching module 314 to switch from primary power supply 310 to the secondary power supply 312 if the plurality of primary power supply parameters fails to satisfy the plurality of primary power supply parameter thresholds. In one embodiment, switching module 314 functions as a plurality of anti-islanding switches configured to ensure that inverter 318 is disconnected from the primary power grid if power associated with primary power supply 310 or secondary power supply 312 is down and to reconnect when the primary power supply 310 or secondary power supply 312 is functioning again.

Referring now to FIG. 3B, the thicker black lines represent voltage lines 390 of the system 300. The voltage lines 390 includes power transmission lines having conductive wires such as copper and aluminum wire. Active voltage lines are hot or live meaning that there is greater than zero voltage transmitting within the system. It is understood that the voltage lines 390 may be active at different times and the system is configured for switching 314 is configured for switching between the primary power supply and the secondary power source. In one embodiment, power may be supplied from the secondary power supply 312 including the secondary power supply source 332 and the energy storage system 316 to components of the switching module 314, and subsequently to the customer load 322. In one embodiment, the voltage lines may be active as defined by the live power transmission emitting from the primary power supply to the load. In another embodiment, the voltage lines may be active as defined by the live power transmission, voltage greater than zero, emitting from the secondary power source, through the switching module, to the load. The energy storage system is energized such that it always maintains active transmitting from the energy storage system to the switching module. Specifically, the energy storage system includes active voltage lines that transmit power up to the group circuit breaker 346. By always maintaining an active voltage, the system is capable minimizing recovery time of power to the load such that full load recovery is provided within 100 milliseconds. The system provides a rapid threshold amount of power to the load during transfer between the primary power supply and the secondary power supply because the energy storage system is energized. Because the energy storage system is energized and contains high discharge batteries, when the primary power supply parameters fail, the high discharge batteries rapidly discharge power to the load depending on the discharge rate of the high discharge battery. Where the high discharge battery is at least 2C, the system rapidly discharges a threshold amount of power, least 2 amperes for up to thirty minutes, to the customer load. Likewise, in other embodiments, where the system includes a 4C high discharge battery, the system rapidly discharges a threshold amount of power, 4 amperes for fifteen minutes, to the customer load. In each embodiment, the at least 500 kW of power is transmitted to the load from the secondary power source within at most 4 milliseconds.

The switching module maintains the set of contacts in electrical communication with the at least one inverter of the secondary power supply such that the switching occurs to provide a rapid threshold amount of power to the customer load 322 during transfer between a primary power supply and a secondary power supply. The energy storage system maintains a hot voltage line to the load providing the threshold amount of power, depending on the size and discharge rate of the high discharge battery 334, to the load when the primary power supply parameters fail to satisfy the primary power supply parameter thresholds. The energy storage system is configured to rapidly discharge power to the customer load such that a full customer load recovery is provided in less than 100 milliseconds.

When the switching module switches solely to the secondary power supply, the power and voltage is supplied by the load at least primarily using the secondary power supply source where the at least one processor 330 is further configured for engaging, concurrently with switching from the primary power supply to the energy storage system, the secondary power supply source after the at least one primary power supply parameter fails to satisfy the respective primary power supply parameter threshold by sending the at least one second signal. Engaging the secondary power supply may include at least starting the secondary power supply source, which may include at least starting a generator. In one embodiment, starting a generator shall mean starting the motor of the generator so that the generator may begin to provide power. In one embodiment, switching from the primary power supply to the energy storage system occurs within at most 4 milliseconds.

The at least one processor is configured for switching from the energy storage system to the secondary power supply source after at least one secondary power supply parameter satisfies a respective secondary power supply parameter threshold by sending at least one third signal to the secondary power supply. The system is further configured such that the at least one processor is configured for, after engaging the secondary power supply source, determining if the at least one secondary power supply parameter satisfies the respective secondary power supply parameter threshold. After engaging the secondary power supply source, the at least one processor is configured for determining if the at least one secondary power supply parameter satisfies the respective secondary power supply parameter threshold. If the at least one secondary power supply parameter satisfied the at least one secondary power supply parameter threshold, then switching from the primary power supply to the secondary power supply. The secondary power supply parameter may include for example, voltage, current, power, which must be maintained between its respective primary power supply parameter threshold having a minimum and maximum secondary power supply voltage for example. Determining that the secondary power supply parameter satisfies the secondary power supply parameter threshold may ensure that the load will receive the necessary load output of at least 500 kW and that the system is not overheating as to cause a fire and to comply with NFPA 855 and UL 9540 standards. Other secondary power supply parameters, including the same type of parameters used for the primary power supply parameters may used and are within the spirit and scope of the present invention.

Also, the secondary power supply thresholds may include minimums and maximums, such as minimum voltage output. Other types of thresholds may be included and is within the spirit and scope of the disclosure. After switching from the primary power supply to at least one of the energy storage system and the secondary power supply source, the at least one processor is configured for sending a fourth signal to the switching module to switch back to the primary power supply if the at least one processor determines the at least one primary power supply parameter satisfies the respective primary power supply parameter threshold. In certain embodiments, the secondary power supply 312 may include at least one first sensor 331 such that the at least one first sensor is configured to monitor at least one of the secondary power supply source and the at least one inverter. The at least one first sensor is configured monitor the at least one of a plurality of secondary power supply parameters of the secondary power supply and transmit the data via the at least one first signal to the at least one processor for determining whether the secondary power supply parameter thresholds have been met. The at least one first sensor communicates with the at least one processor via the communications network of FIG. 3A.

Referring to FIG. 3C specifically, it is to be understood that metering system 394 may be different types of metering systems. The metering system may include components within a vault, components within an entire vault, flat-rate, interval, solar and smart meters net meters systems, bi-directional metering systems and dual metering systems. However, it is understood that other types of meters may be included and is within the spirit and scope of the present disclosure. The metering system is configured to monitor parameters of the system, including parameters attributable to the transmission of power to the loads from the primary power supply and secondary power supply. The metering system may monitor the status of voltage for example, at different components within the system. In other embodiments, the metering system 394 may also include a plurality of sensors, including at least one first sensor 330, in communication with the at least one processor 330 via the components of the system. The at least one first sensor may be configured to transmit metering information via the at least one first signal, including voltage status, to the at least one processor via the communications network of FIG. 3A. It is understood that the system 300 is positioned between customer load 322 and meter 324 such that the metering system 394 is on the customer side of the meter.

Referring to FIG. 3D specifically, the system 300 including the switching module and the secondary power supply is shown illustrating the communication network 311, the metering system 394, and the active power lines 390 of the system as they interact with the components of the system, the customer load 322, and the primary power supply 310 according to an example embodiment. The at least one first sensor (329, 331, and 333) are configured to communicate with the at least one processor 330 via the communication network 311. In certain embodiments, sensor may be a sensor configured to monitor certain electrical attributes of the components of the system. For example, sensors may be used to monitor voltage and current and are used for voltage and current monitoring, logging or proof-of-operation applications. Such sensors may include multi-range AC current transduces, DC current transducers, AC current transformers, Voltage transducers (AC and DC), High-performance transducers, digital current sensor and voltage monitors. Other embodiments of voltage and current sensors may be used and are within the spirit and scope of the present invention. In other embodiments, at least one first sensor may include a plurality of different types of sensors including temperature sensors, proximity sensors, infrared sensors, ultrasonic sensors, light sensors, smoke and gas sensors, touch sensors, color sensors, humidity sensors, etc. such that the at least one first sensor is configured to monitor the components of the system and its respective parameters. The at least one first sensor is configured to send the at least one first signal to the at least one processor. The at least one first signal contains information and data relative to the respective parameter of the components of the system. Sensors (329, 331, and 333) are positioned proximate to certain embodiments in the figures, but it is understood that these sensors may be positioned and others may be positioned throughout the system to monitor the states of the system.

Figure 4A:
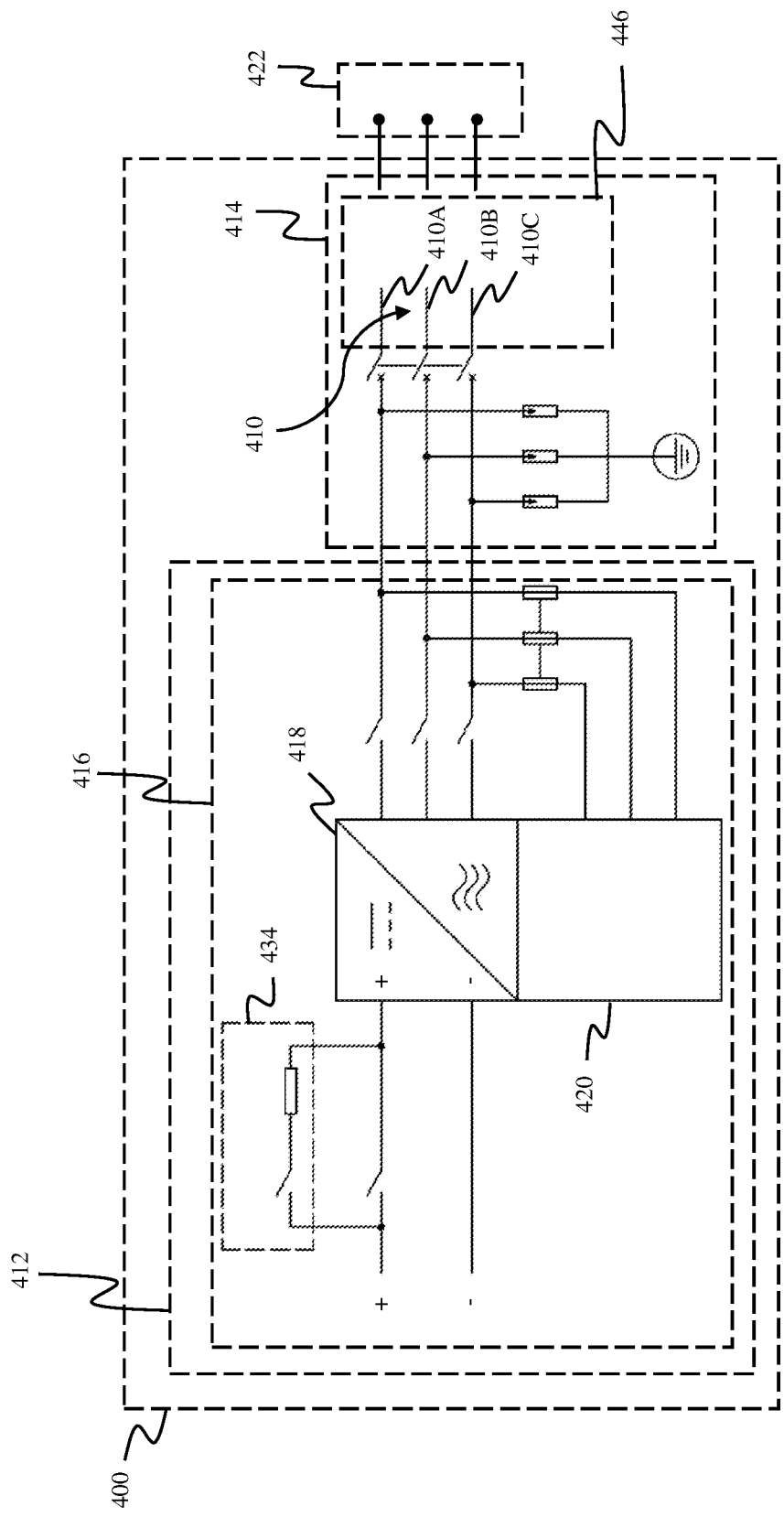
FIG. 4A is diagram illustrating components of the switching module comprising a set of contacts in communication with at least one inverter of the energy storage system, according to an example embodiment.

Referring now to FIG. 4A, a diagram illustrating the switching module 414 (314 in FIGS. 3A-3D) including a set of contacts 410 in communication with at least one inverter 418 (318 in FIGS. 3A-3D) of the energy storage system 416 (316 in FIGS. 3A-3D) is shown, according to an example embodiment. The switching module 414 includes a set of contacts 410 in communication with the at least one inverter 418. In one embodiment, the switching module 414 includes the set of contacts 410 including at least one of contact 410A, contact 410B, and contact 410C where contact 410A, contact 410B, and contact 410C are voltage sense lines. The set of contacts 410 may include voltage sense lines connected in circuitry to the at least one inverter of the secondary power supply such that the secondary power supply is energized in connection with the switching module. The circuitry may include, but is not limited to, connection to resistors, fuse protectors, ground connections, and connection to an isolation transformer of the secondary power supply 412. The set of contacts in communication with the at least one inverter is configured to supply voltage from the secondary power supply to the customer load 422 via the switching module 414. While the primary power supply satisfies its primary power supply thresholds, the energy storage system is energized such that there is active voltage across the set of contacts from the energy storage system up to the group circuit breaker 446 of the switching module. The set of contacts transmits active voltage between the switching module and the secondary power supply so that the system can rapidly discharge a threshold amount of power to the customer load during transfer between the primary power supply and the secondary power supply. Because the voltage is active up to the group circuit breaker, when the primary power supply threshold fails, and the system switches from the primary power supply to the secondary power supply, the power from the system only have to be discharged from the group circuit breaker to the load, minimizing power transmission downtime. Therefore, because the voltage is active across the set of contacts, at least 500 kW of power is provided to the load within 4 milliseconds.

As illustrated in FIG. 4A, the system 400 (300 in FIGS. 3A-3D) includes a high discharge battery 434 (334 in FIGS. 3A-3D) in communication with at least one inverter where the at least one inverter is in communication with the set of contacts of the switching module. In certain embodiments, the high discharge battery may be a direct current (DC) power source or an alternating current (AC) power source. The high discharge battery may be connected to the positive terminal input of the at least one inverter. The at least one inverter may be in communication with a surge protector 420. The set of contacts 410 may include a connection to at least one output of the at least one inverter, where in the example embodiment, the at least one inverter has a 3-phase output.

In another embodiment, the set of contacts 410 may be in communication with an isolation transformer between the connection to the outputs of the at least one inverter such that the isolation transformer includes a high resistance material and is configured to transfer the power from a high discharge battery having alternating current to the load. The isolation transformer may be used to transfer the power between the circuits of the secondary power supply and the switching module to be further configured to power the customer load 422.

In another embodiment, the set of contacts of the switching module connects the at least one inverter to the load to enable the energy storage system to provide a rapid threshold amount of power to the load during transfer between the primary power supply and the secondary power supply. If the secondary power supply parameter threshold is satisfied, then the system will switch from the primary power supply to the secondary power supply. If the secondary power supply parameter threshold fails, then the system may abort switching to the secondary power supply in which case the system, being in communication with the at least one processor, will send the at least one first signal to the at least one processor indicating the health and status of the secondary power supply.

Figure 4B:
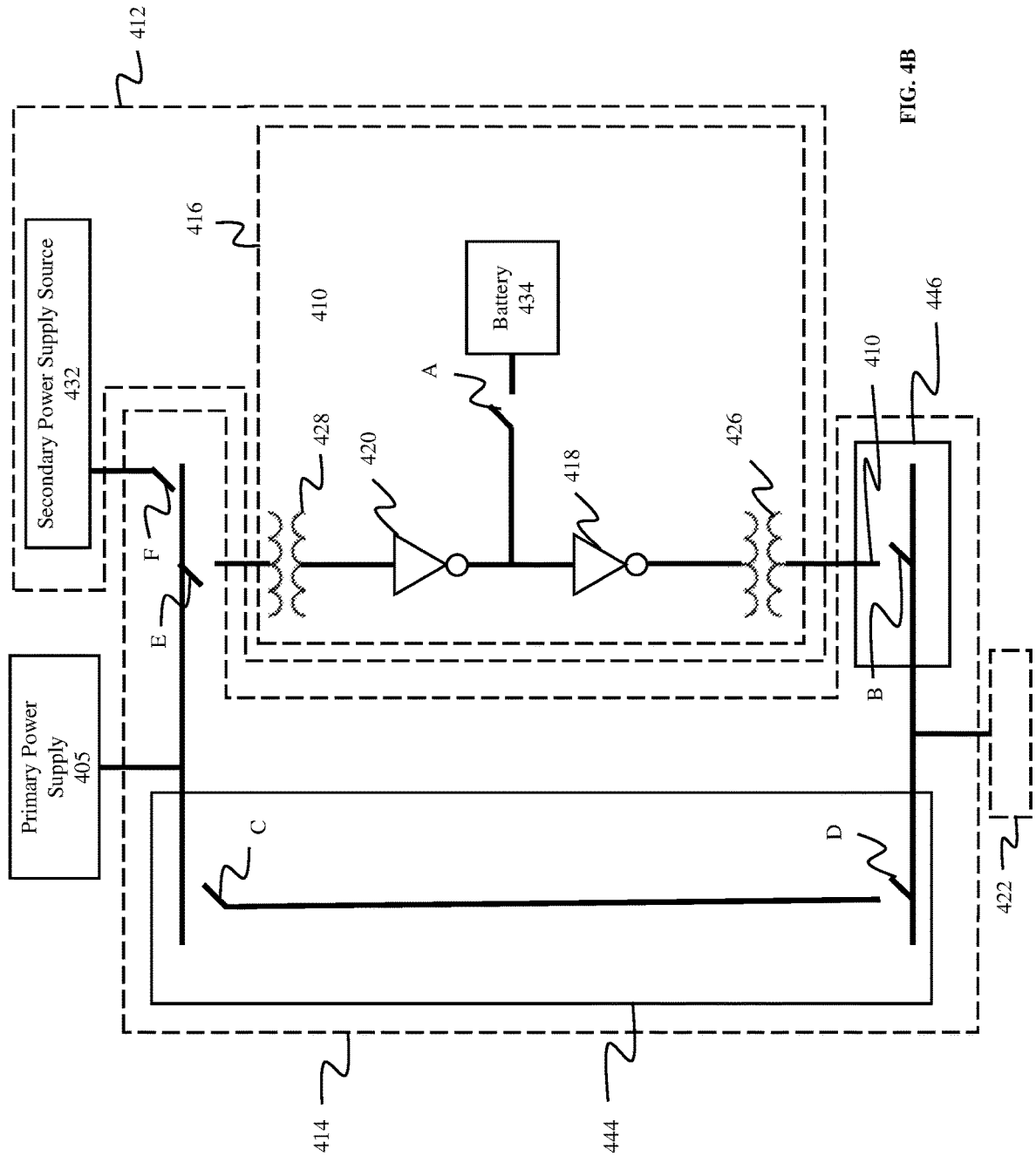
FIG. 4B is a diagram illustrating the secondary power supply having two inverters in electrical communication with the switching module, according to an example embodiment.

Referring now to FIG. 4B, the secondary power supply has two inverters in electrical communication with the switching module is shown, according to an example embodiment. The system includes two inverters, inverter 418 and inverter 420. In some embodiments, depending on the primary power supply, inverter 420 may include a converter configured to convert electrical power from alternating current to direct current. In the embodiment having two inverters, switch gate C and switch gate D are normally open. The at least one processor will send a signal to close switch gate C and switch gate D during at least one of system maintenance and system failure of at the at least one inverter, inverter 420 and inverter 418, thereby creating a global bypass 444 for the system. The system will the reroute the electrical energy from the secondary power supply 412 through the global bypass instead of transferring the electrical power across switch gate B.

Electrical power from the primary power supply is configured to transfer across switch gate E, which is normally closed in this embodiment, to the secondary power supply 412, specifically, the energy storage system in one embodiment, and across a first isolation transformer 428 to the inverter 420. Where the primary power supply includes alternating current, inverter 420 will output direct current. The electrical power then transmits across inverter 418 amplifying the power. The electrical power then transmits across the isolation transformer 426 and the set of contacts 410 of the switching module. In this embodiment, the energy storage system remains energized up until contacts with the group circuit breaker 446 of the switching module, drawing power from the primary power supply. Switch gate A is closed and connected to the high discharge battery maintaining the connection with within the system to be able to rapidly discharge the power from the high discharge batteries to the load when the at least one processor is transferring between the primary power supply and the secondary power supply. The system having two inverters cleans the electrical energy from the primary power supply such that it is free from voltage spikes and drops while transmitting to the load. This two-inverter system eliminates the need for many different components of certain electrical systems. In the embodiment with two inverters, voltage is biased across the at least one inverter, such as inverter 420, such that the system is configured not to engage or discharge the high discharge batteries while the voltage is being transmitted from the primary power supply.

When the at least one processor determines the at least one primary power supply parameter fails to satisfy the respective primary power supply parameter threshold, the at least one processor will switch to the secondary power supply by sending at least one second signal to the switching module. The at least one second signal may include closing and opening a plurality of switch gates. For example, in one embodiment, the second signal may be configured to close switch gate F and open a switch gate in connection between the primary power supply and the switching module. The at least one processor may send at least one second signal to the at least one inverter, such as inverter 420, biasing the voltage to discharge the high discharge battery. The high discharge battery will then rapidly discharge electrical power to the load from the high discharge battery 434, to the inverter 418, across the isolation transformer 426 and the set of contacts 410 to the group circuit breaker 446 of the switching module 414. The at least one second signal may include switching the group circuit breaker to allow the electrical power to transfer to the load. When the at least one processor switches to the secondary power supply source the power from the secondary power supply source transmits across switch gate E to the energy storage system, through inverts 420 and 418, across the set of contacts of the switching module, to the load. Thereby, the electrical power transmitted to the load from the secondary power supply source is cleaned to remove voltage spikes and drops across the system. In another embodiment, when the at least one processor switches to the secondary power supply source, the electrical power transmits across switch gate F to the generator circuit breaker (338 in FIGS. 3A-3D), to the group circuit breaker, and to the load.

Figure 5:
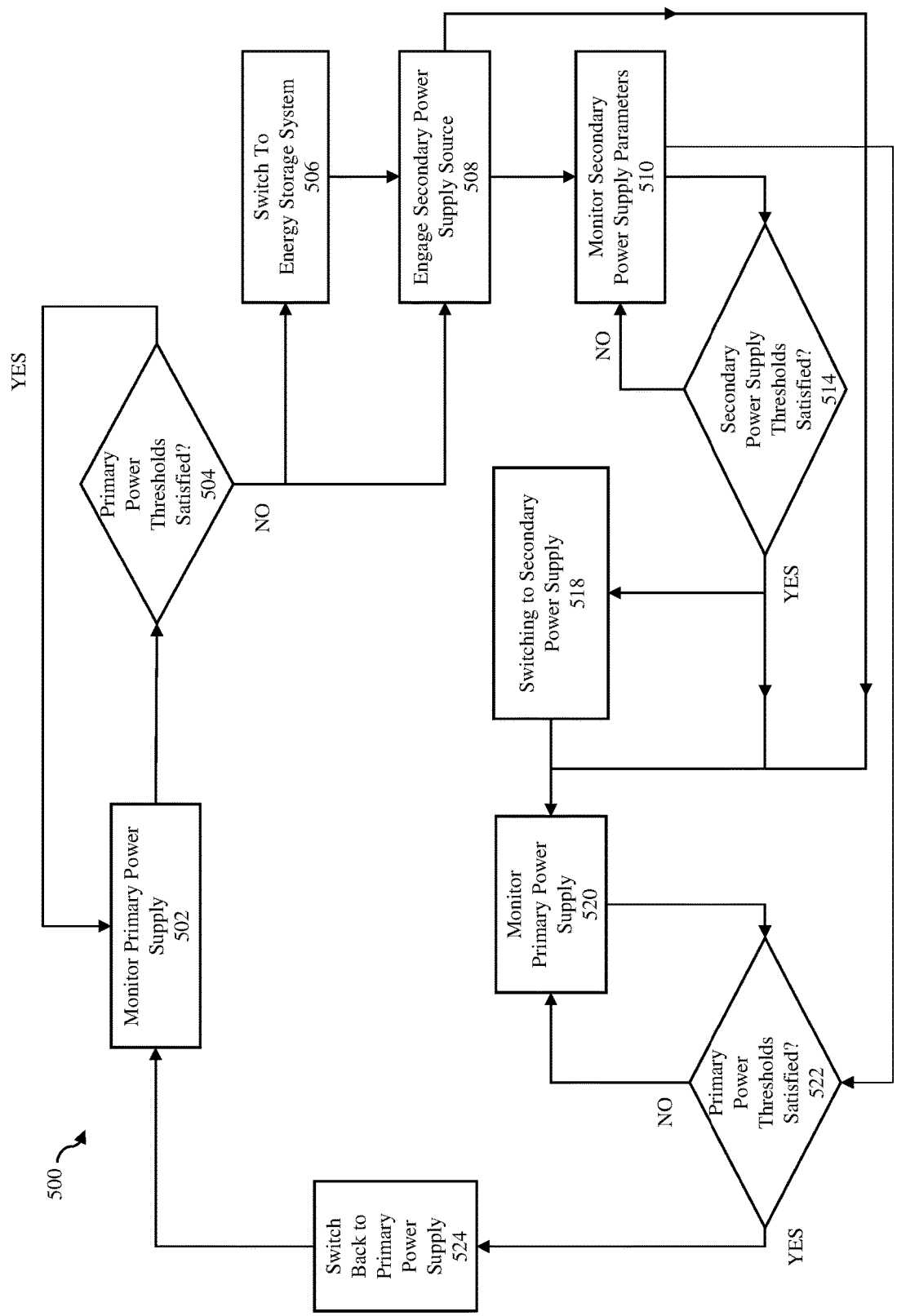
FIG. 5 is a block diagram illustrating an exemplary method for providing a rapid threshold amount of power to a customer load during transfer between a primary power supply and a secondary power supply, according to an example embodiment; and, FIG. 6 illustrates a computer system according to exemplary embodiments of the present technology.

Referring now to FIG. 5 a block diagram illustrating an exemplary method 500 for providing a rapid threshold amount of power to a customer load during transfer between a primary power supply and a secondary power supply is shown, according to an example embodiment. It is to be understood that at least one processor 330 is configured to be continuously monitoring the functionality of system 300 throughout each step in method 500, and that no particular step must be performed for the at least one processor 330 to perform the undermentioned tasks.

At step 502, at least one processor 330 monitors the plurality of primary power supply parameters of primary power supply 310 connected to customer load 322 to determine whether the plurality of primary power supply parameters fails to satisfy the plurality of primary power supply parameter thresholds. It is to be understood that at least one processor 330 continuously performs the monitoring functions based on the aforementioned real-time data collected. The real time data may be transmitted via the at least one first signal to the at least one processor from the components of the system that are in communication with the at least one processor 330. Additionally, cloud services, including a remote processor, may communicate real time data with the at least one processor. The failure of the primary power supply may occur for a plurality of different reasons. For example, a failure to satisfy the plurality of primary power supply parameter thresholds may be caused by common factors, such as but not limited to, outages, stress caused by voltage, frequency fluctuations, faults, or any other applicable disruption or adjustment of power. However, other reasons may also be applicable and are within the spirit and scope of the present invention. For example, primary power supply parameters such as price, power demand from load, and time of day, may alter the primary power supply thresholds and cause the system to switch from the primary power supply to the secondary power supply when the primary power supply thresholds fail.

At step 504, at least one processor 330 determines whether at least one primary power supply parameter fails to satisfy a respective primary power supply parameter threshold based on at least one first signal received from at least one first sensor in electrical communication with the at least one processor and a remote processor communicatively coupled via a communications network with the at least one processor based on a combination of the collected real-time data and the one or more generated profiles of customer load 322. If the plurality of primary power supply parameter thresholds is not satisfied, then the system moves to step 506 where the at least one processor 330 switches from the primary power supply to the energy storage system 316 after the at least one processor determines the at least one primary power supply parameter fails to satisfy the respective primary power supply parameter threshold by sending at least one second signal to the switching module. The at least one second signal may include electrical signals having information configured to execute the functions of the switching module. Because the energy storage system is energized such that there is active voltage from the energy storage system up to the group circuit breaker 346 of the switching module, the system can rapidly discharge power to the load as the system switches to the secondary power supply, namely, the secondary power supply source. Therefore, the system can provide full customer load recovery in less than 100 milliseconds which may resolves the current issues mission critical facilities face with existing technology.

In step 506, and concurrently with step 508, the switching module 314 is utilized to switch from primary power supply 310 to energy storage system 316 allowing energy storage system 316 to function in a high performance/discharge manner due to the energy capacity of the high discharge battery. In one embodiment, the switch from primary power supply 310 to energy storage system 316 occurs within 4 milliseconds after the at least one processor 330 makes the decision to switch from the primary power supply 310 to the secondary power supply 312. This is important because it allows for full load recovery in a very small amount of time. In one embodiment, the system is configured that the threshold amount of power to customer load 322 is provided by the applicable energy power supply in less than 100 milliseconds. Additionally, it is understood that executing the switch from the utility power supply to the energy storage system occurs within 4 milliseconds after making the determination to switch from the primary power supply to the secondary power supply. At the same time step 506 occurs, or shortly thereafter, step 508 occurs.

In step 508, at least one processor 330 engages, concurrently with switching from the primary power supply to the energy storage system in step 506, the secondary power supply source after the at least one primary power supply parameter fails to satisfy the respective primary power supply parameter threshold by sending the at least one second signal.

In one embodiment, engaging secondary power supply source 332 may include initiating or starting up a generator, conducting switching of an alternate electrical grid or other power source so that the secondary power supply source is ready to provide power to the load. However, it is understood that other means of engaging the secondary power supply source may be used and is within the spirit and scope of the present invention. After secondary power supply source 332 has been engaged, step 510 occurs.

In step 510, at least one processor 330 continuously monitors a plurality of secondary power supply parameters of the secondary power supply 312 to determine if the plurality of secondary power supply parameters satisfy a plurality of secondary power supply parameter thresholds. In certain embodiments, the at least processor may also at the same time continue to monitor the primary power source threshold such that the switch back to the primary power supply before switching from the energy storage system to the secondary power supply source.

At step 514, at least one processor 330 decides whether the plurality of secondary power supply parameters satisfy the plurality of secondary power supply parameter thresholds. In step 514, if the plurality of secondary power supply parameters satisfies the plurality of secondary power supply parameter thresholds, then the process moves to step 518.

In step 518, at least one processor 330 switches from the energy storage system to the secondary power supply source after at least one secondary power supply parameter satisfies a respective secondary power supply parameter threshold by sending at least one third signal to the secondary power. The third signal is an electrical signal including information configured to execute the functions of the secondary power supply, for example, the third signal may contain information to engage the secondary power supply source, which may include starting a generator in one example embodiment. It is to be understood that after the switch from energy storage system 116 to secondary power supply 312 occurs, then the process moves to step 520 and step 521.

In one embodiment, in step 520, following the switch to secondary power supply at step 518, the switching module 314 is in communication with the at least one processor 330. The at least one processor monitors the primary power supply at step 520 using the communications network 311 in communication with the components of the system. The communications network may include at least one first signal configured to monitor the primary power supply by measuring primary power supply parameters at certain components within the system via the metering system. At least one processor 330 monitors the plurality of primary power supply parameters of the primary power supply 310 connected to customer load 322 to detect if the plurality of primary power supply parameters continues to satisfy the plurality of primary power supply parameter thresholds. At during any step of method 500, at which point the at least one processor determines that at least one primary power supply parameters satisfy its respective primary power supply parameter threshold, then the at least one processor is configured to switch form the secondary power supply back to the primary power supply.

At step 522, at least one processor 330 determines whether at least one primary power supply parameter fails to satisfy a respective primary power supply parameter threshold based on at least one first signal received from at least of (i) at least one first sensor in electrical communication with the at least one processor and (ii) a remote processor communicatively coupled via a communications network with the at least one processor based on a combination of the collected real-time data and the one or more generated profiles of customer load 322. It is to be understood that a failure to satisfy at least one of the primary power supply parameter thresholds may be caused by common factors, such as but not limited to, outages, stress caused by voltage, frequency fluctuations, faults, or any other applicable disruption or adjustment of power. If the at least one processor determines that at least one of the primary power supply parameter thresholds is satisfied, then the process moves to step 524.

In step 524, the automated transfer switches of the switching modules 314 will switch power back to the primary power supply from the secondary power supply. The at least one processor is configured for sending a fourth signal to the switching module to switch back to the primary power supply if the at least one processor determines the at least one primary power supply parameter satisfies the respective primary power supply parameter threshold. The at least one fourth signal may include electrical signals having information configured to execute the functions of the switching module. If the utility power supply parameters fail to satisfy the utility power supply thresholds, then the process moves back to step 520, and the system continues to monitor the primary power supply parameters and to determine when it is appropriate to move back to the primary power supply when the at least one processer determines that the primary power supply thresholds are satisfied.

In step 524, when the primary power supply parameters are satisfied, then the system transfers power from the secondary power supply to back to the primary power supply. The switching module 314 is utilized in step 524 to execute the switch from the secondary power supply to the primary power supply and then at least one processor 330 proceeds to continuously monitor the components of system 300 at step 502 to determine whether the primary power parameter thresholds are satisfied.

In another embodiment, exemplary method 500 may include cleaning the electrical power, such that the system includes two inverters and the electrical power from the primary power source is cleaned. By cleaning the electrical power, the electricity across the system and transferred to the load is free from voltage spikes and drops.

Figure 6:
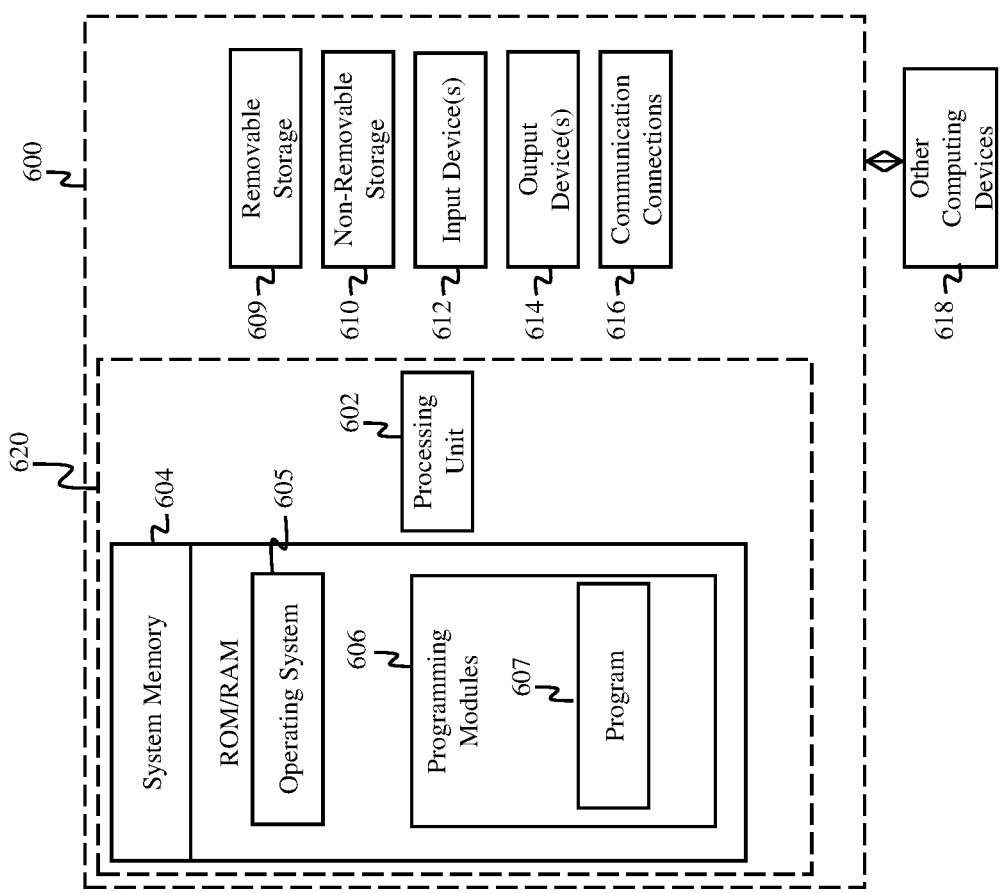

Referring now to FIG. 6, a block diagram of a system including an example computing device 600 and other computing devices is shown, according to an example embodiment. Consistent with the embodiments described herein, the aforementioned actions performed by system 300 may be implemented in a computing device, such as the at least one processor 330. Any suitable combination of hardware, software, or firmware may be used to implement the at least one processor 330. The aforementioned system, device, and processors are examples and other systems, devices, and processors may comprise the aforementioned computing device. Furthermore, the at least one processor 330 may comprise an operating environment for system 300. Processes, data related to system 300 may operate in other environments and are not limited to the at least one processor 330.

A system consistent with an embodiment of the disclosure may include a plurality of computing devices, such as a computing device 600 of FIG. 6. In a basic configuration, computing device 600 may include at least one processing unit 602 and a system memory 604. Depending on the configuration and type of computing device, system memory 604 may comprise, but is not limited to, volatile (e.g., random access memory (RAM)), non-volatile (e.g., read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions illustrated in FIG. 2, execute any of the actions of the function of the components illustrated in FIGS. 3A-4. For example. Furthermore, embodiments of the disclosure may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable, and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of system 300. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow system 300 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on at least one processing unit 602, programming modules 606 (e.g., program module 607) may perform processes including, for example, one or more of the stages of a process. The aforementioned processes are examples, and at least one processing unit 602 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. It is also understood that components of the system may be interchangeable or modular so that the components may be easily changed or supplemented with additional or alternative components.

While certain embodiments of the disclosure have been described, other embodiments may exist. Furthermore, although embodiments of the present disclosure have been described as associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for providing a rapid threshold amount of power to a customer load during transfer between a primary power supply and a secondary power supply, wherein the system is electrically connected between a customer metering system and the customer load, and wherein the system comprises:
the secondary power supply comprising a secondary power supply source and an energy storage system, wherein the secondary power supply is not in electrical connectivity with the primary power supply; and
a switching module;
wherein the secondary power supply source is configured for generating electrical power;
wherein the energy storage system is in electrical communication with the secondary power supply source, wherein the energy storage system comprises a high discharge battery, wherein the high discharge battery is at least 2C, and wherein the energy storage system is configured to rapidly discharge power to the customer load;
wherein, the switching module is in electrical communication with the energy storage system, wherein the switching module comprises at least one set of contacts in electrical communication with at least one inverter of the secondary power supply, wherein the switching module is configured for switching between the primary power supply and the secondary power supply; and
wherein the primary power supply is not in electrical connectivity with the secondary power supply such that it cannot charge the high discharge battery.

2. The system of claim 1, where the system further includes at least one processor, wherein the at least one processor is configured for:
determining if at least one primary power supply parameter fails to satisfy a respective primary power supply parameter threshold based on at least one first signal received from at least one of at least one first sensor in electrical communication with the at least one processor and a remote processor communicatively coupled via a communications network with the at least one processor; and
switching from the primary power supply to the energy storage system after the at least one processor determines the at least one primary power supply parameter fails to satisfy the respective primary power supply parameter threshold by sending at least one second signal to the switching module.

3. The system of claim 2, wherein the energy storage system is energized.

4. The system of claim 3, where the at least one processor is further configured for:
engaging, concurrently with switching from the primary power supply to the energy storage system, the secondary power supply source after the at least one primary power supply parameter fails to satisfy the respective primary power supply parameter threshold by sending the at least one second signal; and
switching from the energy storage system to the secondary power supply source after at least one secondary power supply parameter satisfies a respective secondary power supply parameter threshold by sending at least one third signal to the secondary power supply.

5. The system of claim 4, wherein the system further configured such that the at least one processor is configured for, after engaging the secondary power supply source, determining if the at least one secondary power supply parameter satisfies the respective secondary power supply parameter threshold.

6. The system of claim 4, where engaging the secondary power supply source comprises at least starting a generator.

7. The system of claim 2, wherein the at least one processor, after switching from the primary power supply to at least one of the energy storage system and the secondary power supply source, is configured for sending a fourth signal to the switching module to switch back to the primary power supply if the at least one processor determines the at least one primary power supply parameter satisfies the respective primary power supply parameter threshold.

8. The system of claim 2, switching from the primary power supply to the energy storage system occurs within at most 4 milliseconds.

9. The system of claim 1, where the energy storage system comprises at least a high discharge 4C battery, the at least one inverter, and an isolation transformer.

10. The system of claim 1, wherein the system satisfies with at least one of NFPA 855 and UL 9540 standards.

11. The system of claim 1, where at least one secondary power supply source comprises at least one of a natural gas fuel powered generator, a gasoline fuel powered generator, a propane fuel powered generator, a diesel fuel powered generator, a solar fuel powered generator, and a second primary power source.

12. The system of claim 1, wherein at least one secondary power supply source outputs at least 500 kW.

13. The system of claim 1, where the customer load is at least 500 kilowatts.

14. The system of claim 1, where the energy storage system is configured to rapidly discharge power to the customer load such that a full customer load recovery is provided in less than 100 milliseconds.

15. A system for providing a rapid threshold amount of power transfer to a customer load of at least 500 kW within at most 4 milliseconds, wherein the transfer is between a primary power supply and a secondary power supply, wherein the system is electrically connected between a customer metering system and the customer load, and wherein the system comprises:
wherein the secondary power supply is not in electrical connectivity with the primary power supply;
a secondary power supply source generating at least 500 kW of electrical power;
an energy storage system comprising least a high discharge 4C battery, at least one inverter, and an isolation transformer, and wherein the energy storage system is energized and configured to rapidly discharge power to the customer load such that, in a transition configuration, the high discharge 4C battery provides a full customer load recovery to the customer load in less than 100 milliseconds;
a switching module, in electrical communication with the energy storage system, wherein the switching module comprises at least one set of contacts in communication with the at least one inverter of the energy storage system, wherein the switching module is configured for switching between the primary power supply to provide power to the customer load in a primary configuration, and the secondary power supply to provide power to the customer load in the transition configuration and a secondary configuration; and wherein the high discharge 4C battery and the switching module is configured such that the high discharge 4C battery cannot receive power from the primary power supply in the primary configuration, the transition configuration, and the secondary configuration.

16. The system of claim 15, wherein the system satisfies at least one of NFPA 855 and UL 9540 standards.

17. The system of claim 16, where the system further includes at least one processor, wherein the at least one processor is configured for:
  determining if at least one primary power supply parameter fails to satisfy a respective primary power supply parameter threshold based on at least one first signal received from at least one first sensor in electrical communication with the at least one processor and a remote processor communicatively coupled via a communications network with the at least one processor; and
  switching from the primary power supply to the energy storage system after the at one least processor determines the at least one primary power supply parameter fails to satisfy the respective primary power supply parameter threshold by sending at least one second signal to the switching module.

18. The system of claim 17, wherein the at least one processor is configured for:
  engaging, concurrently with switching from the primary power supply to the energy storage system, the secondary power supply source after the at least one primary power supply parameter fails to satisfy the respective primary power supply parameter threshold by sending the at least one second signal; and
  switching from the energy storage system to the secondary power supply source after at least one secondary power supply parameter satisfies a respective secondary power supply parameter threshold by sending at least one third signal to the secondary power supply.

19. The system of claim 18, where the system further includes the at least one processor, wherein the at least one processor is configured for, after engaging the secondary power supply source, determining if the at least one secondary power supply parameter satisfies the respective secondary power supply parameter threshold.

* * * * *